(12) United States Patent
Knapp

(10) Patent No.: US 6,517,006 B1
(45) Date of Patent: Feb. 11, 2003

(54) THERMOSTATIC MIXING FAUCET HAVING IMPROVED STABILITY

(75) Inventor: Ing. Alfons Knapp, Biberach (DE)

(73) Assignee: Masco Corporation, Taylor, MI (US)

( * ) Notice: Subject to any disclaimer, the term of this patent is extended or adjusted under 35 U.S.C. 154(b) by 0 days.

(21) Appl. No.: 10/019,968

(22) PCT Filed: May 8, 2000

(86) PCT No.: PCT/US00/12529

§ 371 (c)(1),
(2), (4) Date: Nov. 7, 2001

(87) PCT Pub. No.: WO00/68754

PCT Pub. Date: May 8, 2000

(30) Foreign Application Priority Data

May 7, 1999 (IT) ..................................... TO99A000371
May 31, 1999 (IT) ..................................... TO99A000455

(51) Int. Cl.⁷ ......................... G05D 23/13; G05D 23/00
(52) U.S. Cl. ................................. 236/12.2; 137/625.41
(58) Field of Search ............................. 236/12.2, 12.21; 137/625.41

(56) References Cited

U.S. PATENT DOCUMENTS

| 3,987,819 A | 10/1976 | Scheuermann |
| 4,327,758 A | 5/1982 | Uhlmann |
| 5,505,225 A | 4/1996 | Niakan |
| 5,931,374 A | 8/1999 | Knapp |

OTHER PUBLICATIONS

International Search Report for PCT/US00/12529 dated Jun. 22, 2000.

*Primary Examiner*—William E. Tapolcal
(74) *Attorney, Agent, or Firm*—Carlson Gaskey & Olds

(57) ABSTRACT

Two flow control ceramic discs (22 and 24) for a thermostatic valve (10) have ports (30, 32, 38 and 40) to adjust water flow from a closed to a full open position. Ceramic disc (24) has a contoured opening (38 and 40) that has a wide section (84) and a narrow section (85) that provide regulation fields with significant different capacities of flow rates.

7 Claims, 5 Drawing Sheets

THERMOSTATIC MIXING FAUCET HAVING IMPROVED STABILITY

TECHNICAL FIELD

The field of this invention relates to a thermostatically controlled mixing valve and more particularly to a thermostatic controlled mixing valve with a volume control feature incorporated therein.

BACKGROUND OF THE DISCLOSURE

Mixing valves are well known and common in the plumbing field. These valves provide a flow of mixed water from separate hot and cold water supplies. Secondly, thermostatic control for handle mixer valves are well known. One reason for thermostatic control is to eliminate constant readjustment of the valve when the temperature of the hot water supply fluctuates. The temperature of the hot water supply may vary substantially. Furthermore, the pressure within the cold water line may also vary changing the proportions of hot and cold water flow and thereby fluctuating the temperature of the mixed water.

Known thermostatic valves have packaging problems and are often significantly bulkier than standard mixing valves that do not incorporate the thermostatic regulation. This bulkiness is due to the flow path that has always been used for thermostatic faucets, namely the supply inlets approach the centrally located thermostatic valve from a radially outer position.

When thermostatic valves are incorporated into mixer valves, the volume or flow control valves may be installed either downstream or upstream from the thermostatic valve element. When the flow is regulated downstream of the thermostatic element within the mixed water flow, installation of non-return valves are needed in order to prevent the possibility of communication between the hot water supply and the cold water supply. When the flow control of the hot and cold water supplies is upstream of the thermostatic valve before the water is mixed, the return valves are not needed. For this economic reason, most thermostatic mixing valves have the volume control upstream of the thermostatic element.

However when the flow is regulated with respect to the hot and cold water supplies, the thermostatic device is unable to maintain the constant temperature due to the variations of the flow rates. It is well known that when hot and cold water supply pressures are approximately equal or with the hot supply pressure being only slightly lower than the cold water pressure, the difference in flow rate or variation between the hot and cold water supplies is increased when the total flow is reduced and the rise in temperature can sometimes become significant. On the other hand, if the hot water supply pressure is substantially lower than the cold water supply pressure, as is often the case due the increased corrosion of the hot water pipelines, the difference in the flow rate or variation of the flow rate between the hot and cold water supplies is decreased as the total flow rate is reduced.

Contoured apertures in a pair of disc plate valves have been known to contour the water flow profile between the hot and cold water supplies. However, these plate valves are set to move both rotatably and translationally with respect to each other to mechanically control both the total flow rate and the temperature mix of the hot and cold water.

A thermostatic mixing valve has been developed that includes two inlets for hot water and cold water, a mixing chamber, passages between the inlets and the mixing chamber, an outlet for the mixed water which runs from the mixing chamber, an expanding thermostatic element placed, at least in part, within the outlet so that it will be in contact with the mixed water. A slide valve is activated by the thermostatic element and acts on one or both of the inlet passages to maintain the mixed water at a constant temperature. The inlets are located in a central body situated inside the slide valve activated by the thermostatic element. A pair of valve plates crossed by passages for the water are positioned to control total flow rate through the inlets for the hot water and cold water without affecting the outlet for the mixed water. The valve plates are controlled by rotation of an external body or housing of the thermostatic mixing valve. A thermostatic mixing valve of this kind has proved to be very advantageous, yet (like other types of thermostatic mixing valve) it can prove to be inconvenient in certain conditions.

If a thermostatic mixing valve, which is designed to be able to deliver a determined rate of flow, supplies a device downstream which, due to its own high resistance only allows delivery of a much lower rate of flow, the fall in pressure at the inlet produced by the pair of valve plates is greatly reduced in comparison to the fall in pressure at the inlet produced by the downstream device and the pressure inside the thermostatic mixing valve is close to the pressure in the supply pipes. If a considerable difference in pressure then occurs between the hot and cold water supplies, for example because of the actuation of a device with high rate of flow that uses primarily hot or cold water upstream from thermostatic valve, the valve will then be unstable and will start to oscillate, because of the cross-flow which occurs inside the thermostatic valve. The oscillation will cause malfunctioning and temperature instability in the mixed water delivery downstream from the thermostatic valve. This situation may occur when a thermostatic mixing valve is designed to supply a relatively high rate of flow, such as for example 50 or 60 liters per minute at 3 bars but is used with a much lower delivery rate, for example 9 liters per minute due to the resistance or restriction at the outlet on certain downstream devices. This situation occurs, for example, when the thermostatic mixing valve is installed to supply a bank with multiple outlets, each of which is equipped with its own on/off valve, and the user makes use of only one outlet. More generally, the situation occurs when the thermostatic mixing valve is capable of supplying many devices and only one or a few of these devices are actually in operation at any given time.

In fact, the user could in theory prevent this instability by accurate regulation of the thermostatic mixing valve, so as create a resistance at the inlet that proportional to the resistance at the outlet. However, this is not possible in practice, because well-known thermostatic mixing valves do not offer sufficiently sensitive regulation at low rates of flow. Furthermore, since the rate of flow is limited at the outlet of a device with high restriction or resistance, the user is not aware of the effect of the regulation at the downstream device and is therefore not in a position to decide whether the regulation he has carried out is adequate to avoid the noted problem.

This problem which also occurs with other kinds of thermostatic mixers, has usually been remedied by installing a pressure controller in the supply pipes upstream of the thermostatic mixing valve. This pressure controller, however, increases the size, complexity and expense of the installation and renders the device less reliable.

What is needed is a compact thermostatic valve that is easily assembled and controls the temperature of the mixed water output. What is also needed is a thermostatic control built into a valve with flow control that provides proper thermostatic control at a wide range of flow rates.

SUMMARY OF THE DISCLOSURE

In accordance with an aspect of the invention, a thermostatic mixing valve has a cold water inlet port and a hot water inlet port in communication with a base having two supply ports. A handle body is rotatably mounted onto the base and is operably connected to a first valving surface with two inlet passages therethrough that are operably positioned adjacent the two supply ports for controlling total flow rate into the housing. A thermostat element is operably connected to a second valving surface to move the second valving surface between a first and second seat for controlling the relative flow from the first and second inlet passages in response to the temperature of fluid in the mixing chamber.

The ports and the first valving surface are incorporated in two concentrically mounted plates that can be rotated with respect to each other and provided with openings therethrough for the controlled passage of the fluid through the two plates. The opening in one of the valve plates which control the inlet pipes for hot water or cold water is constructed so as to sub-divide the whole field of regulation determined by the relative rotation of the plates into at least two successive fields. The first field of regulation is positioned adjacent to the shut off position is and formed by a narrow section of the opening. The second field of regulation is positioned and after the first is formed by a wide section of the opening. The first and second fields are preferably inserted into both the hot water and cold water passages.

When the thermostatic mixing valve has to supply one or more devices, which provide a low flow rate, it is positioned into its first field of regulation, which occurs as soon as the thermostatic mixing valve is moved from its closed position. The narrow section of at least one of the inlet passage openings then causes a relatively marked fall in pressure, even in the presence of a low flow rate caused by high resistance at the outlet, and renders the thermostatic mixing valve practically and advantageously stable to even significant differences in pressure between the supply pipes. When the thermostatic mixing valve is used to supply devices with large flow rates, the thermostatic valve is positioned to its second field of regulation. The wide section of the inlet opening enables delivery of large flow rates. Under the condition, any differences in pressure between the hot and cold supply, even if significant, do not cause temperature fluctuation problems.

It is desirable to provide an intermediate field of regulation interposed between the two fields of regulation determined by the narrow and large sections in the openings respectively. The intermediate section has a width which is intermediate between those of the other two fields of regulation.

It is also possible to use inlet passage apertures for both valve plates which have special shapes. Preferably, one of the valve plates (for example the fixed one) should have inlet openings which have the conventional shape of an elongated curved slot. The other valve plate (for example the moveable one) should have inlet openings shaped with different passage sections to determine the two or more distinct fields of regulation of the thermostatic mixing valve.

In one embodiment of the invention, the inlet openings of one of the valve plates are in the shape of elongated slots. At least one of these has a first section of reduced width, a second section of enlarged width and, optionally, an intermediate section of width which is intermediate between the widths of the first and second sections. In another embodiment of the invention, the inlet opening of one of the valve plates has large, uniform width. At least one of these openings has only a first section that extends fully through the plate. A second section has a limited depth and does not fully pass through the valve plate. An optional intermediate section of greater depth than that of the second section can be provided between the first section and the second section.

In another embodiment of the invention the openings include sections that fully passes through the plate and at least one section of limited depth that does not fully pass through the valve plate which has a narrower width and is adjacent a narrow slot section.

In accordance with another aspect of the invention, visible indicators on parts of the thermostatic mixing valves inform the user which field of regulation the thermostatic mixing valve is operating in at any given time. In addition or alternatively for the visible indicators, devices with an elastic or detest release, can give the user a tactile warning of passage of the thermostatic mixing valve from one to another field of regulation. This device is useful in making it very easy for the user to identify the field of regulation of the thermostatic mixing valve which is most suitable.

In this fashion, a compact thermostatic cartridge is provided. The cartridge can be housed in a mixer valve flow regulator with volume or flow rate control disc plates that have contoured apertures to assure set flow ratios between the hot and cold water supplies independent of the total flow rate through the disc plates.

BRIEF DESCRIPTION OF THE DRAWINGS

Reference now is made to the accompanying drawings in which.

DETAILED DESCRIPTION OF THE PREFERRED EMBODIMENT

Figure 1:
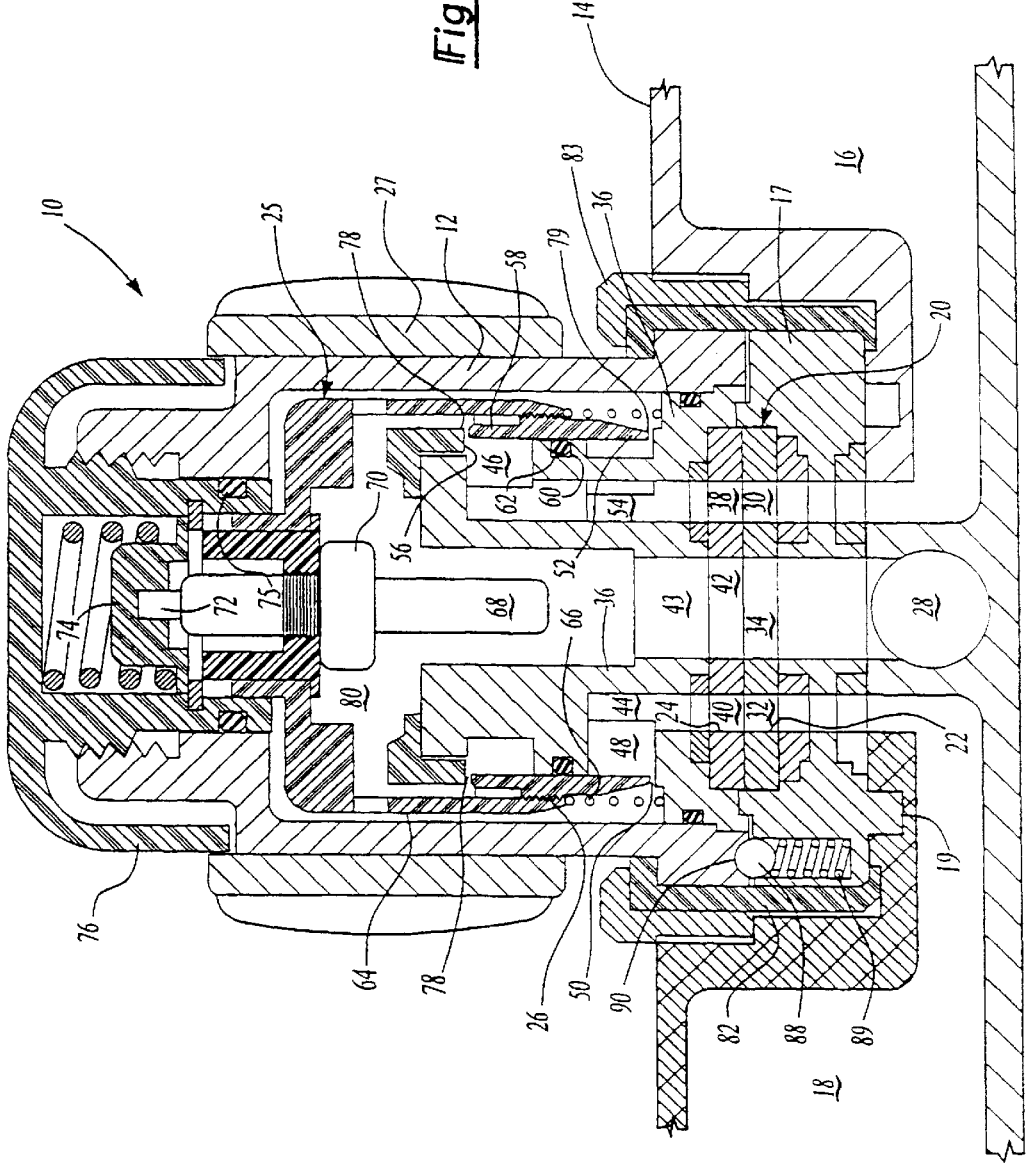
FIG. 1 is a side-segmented view of a thermostatic mixing valve in accordance with one embodiment of the invention.
Figure 2:
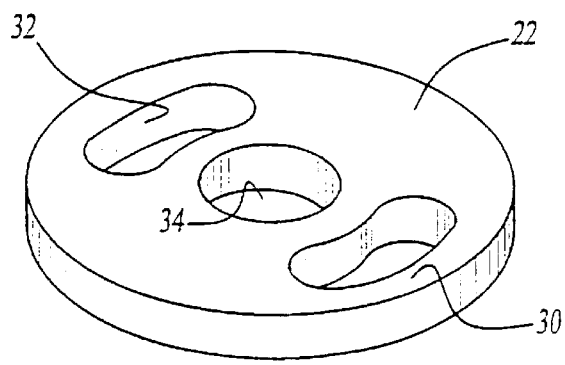
FIG. 2 is a top perspective view of a fixed plate for the flow rate regulation shown in FIG. 1.

Referring to FIG. 1, a thermostatic mixing valve 10 includes a rotatable body 12 that is rotatably mounted in piping fixture or other suitable piping fixture 14. The piping fixture 14 includes a cold water supply 16 and hot water supply 18. The handle body 12 is rotatably mounted to a faucet base 17 that is affixed within the fixture 14. The base 17 has a positioning lug 19 seated in a lug receiving hole in fixture 14. The mixing valve includes a flow rate control valve 20 that includes two ceramic disc plates 22 and 24. Fixed ceramic disc plate 22 is mounted in base 17. Rotatable ceramic disc plate 24 is mounted to a bottom of a cartridge assembly 25. The cartridge assembly 25 includes a thermostatic controlled second valve 26 mounted downstream from the flow control valve 20 within the handle body 12 to control the temperature of the mixed water flowing to an outlet passage 28. The thermostatic valve is described in detail in PCT Publications WO 95/30940 and 95/30939 and is incorporated herein by reference.

The fixed ceramic disc plate 22 has respective cold and hot supply ports 30 and 32 and a centrally located mixed water outlet port 34. The ceramic disc plate 24 is affixed to the rotatable handle body 12 via an internal body member 36 of the cartridge assembly 25 for rotation with the handle body 12. The movable ceramic disc plate 24 has a cold water inlet 38 and hot water inlet 40 and a centrally located outlet aperture 42 that is in constant alignment with outlet port 34 of fixed ceramic disc plate 22. The rotation of the handle body 12 rotates the ceramic disc plate 24 with respect to disc plate 22 selectively align or misalign the inlet 38 and 40 with inlets 30 and 32 to control the total flow rate of the hot and cold water. The handle body 12 may be circumscribed with a thermally insulating handle sleeve 27 that functions as the handle.

The internal body member 36 has a hot water inlet passage 44 aligned with the hot water inlet 40 and a cold water inlet passage 46 aligned with the cold water inlet 42. A central mixed water outlet 43 is in alignment with outlets 42, 34 and 28. The passage 44 has an annular shaped downstream end 48 adjacent an annular valve seat 50 in internal body member 36 and the axial lower end 52 of thermostatically controlled valve 26 which is annular in shape. The passage 46 has an annular shaped downstream end 54 adjacent an annular valve seat 56 and the axial upper end 58 of the annular shaped valve 26. Valve seat 56 is secured to the internal body member 36. The passage 46 passes axially through the annular valve 26 within its radial confines. The internal body member 36 has an intermediate seal seat 60 that seats a seal 62 that seals off the passage 44 from 46 within the axial extent of the annular valve 26.

The annular valve 26 is affixed to a collar 64 via a threaded engagement. A spring 66 biases the valve 26 to engage the seat 56 and close off passage 46. The collar 64 extends above the internal body section 36 and is operatively affixed to body section 68 of thermostatic element 70. The thermostatic element has an expanding piston leg 72 that engages a safety spring release seat 74 that is mounted in adjustment handle 76. The adjustment handle 76 is screwed onto handle body 12 with an appropriate seal 75 for mechanically raising and lowering the thermostatic assembly 70 within the cartridge assembly 25. The body section 68 may extend into the central outlet passage 42 of the internal body 36.

The cartridge assembly 25 maintains its structural integrity because the annular valve 26 is entrapped between the internal body valve seat 50 and the upper seat 56. The thermostatic element 70 is affixed to the collar 64 which in turn is affixed to the annular valve 26. The spring element 66 is also entrapped between the internal body 36 and the valve 26.

A retaining ring 82 which when it is inserted, firmly assembles the external body 12 of the device, the internal body 36 and the faucet base member 17. The retaining ring 82 can be made from plastic material and may conveniently be fixed with an elastic release. The plastic material may have a low coefficient of friction, so that the retaining ring 82 also has the function of limiting friction when the thermostatic mixing valve 10 is rotated to regulate the rate of flow. In this way the entire thermostatic mixing valve 10 assumes the character of a cartridge which can be installed and removed from the piping fixture 14 without entailing any disassembly of its parts. This same characteristic enables the entire device to be assembled independently of the inlet during manufacture, and the two parts to be stored separately in the warehouse. A locking ring 83 is then screwed into piping fixture 14 to mount the thermostatic valve 10 in place.

The water flow from the cold water supply 16 passes up through the control valve 20 and axially upward through the internal body member with the cold water passing radially outward through the adjustably sized gap 78 between the seat 50 and annular valve 26 and into mixing chamber 80. The flow path from the hot water supply 18 passes through the control valve 20 and axially upward through the internal body member with the hot water passing radially outward through the adjustably sized gap 79 between the seat 56 and annular valve 26 to mixing chamber 80.

The water thereafter is mixed and passes back radially inwardly to the center outlet passage 42 and out of the cartridge 25 and mixing valve 10. The thermostatic adjustment automatically slides the valve 26 axially to adjust the size of the two gaps 78 and 79. The specific internal construction of the thermostatic element 70 is well known in the art and is commercially available.

The volume control valve 20 when in the closed position prevents any communication between water supplies 16 and 18 and thus the faucet need not be provided with non-return valves.

Reference now is made to FIGS. 2–6 for a more detailed description of the ceramic disc plates 22 and 24 and the shape and operation of the ports 30 and 32 in the fixed plate 22 and inlets 38 and 40 in the movable plate. For ease of illustration, the two plates are shown, as having different diameters in FIGS. 4–6 but it is understood that the diameters of the respective plates are not critical to the invention and they may have the same diameter.

These apertures 38 and 40 in movable plate 24 are shaped so as to sub-divide the entire field of regulation determined by the relative rotation of the plates into at least two distinct successive fields. The first field of regulation, adjacent to the shut off position, is determined by at least one inlet passage aperture of narrow section, inserted in at least one of the pipes for hot water and cold water. The second field of regulation is determined by inlet passage apertures of larger flow section, inserted in both the hot water and cold water pipes. It is not necessary to use inlet passage apertures having special shapes in both valve plates. One of the valve plates, for example the fixed valve 22, illustrated in FIG. 2, can have, at the side of a central passage aperture 34 for mixed water (which however may be absent in other forms of the embodiment), two inlet hot and cold passage apertures 30 and 32 having normal shape with an elongated curved slot. This is therefore effectively a valve plate of normal conventional construction.

The characteristic structures of the invention however concern the other valve plate, for example, the moveable valve plate 24. The passage apertures having a narrow section 85, which determine the first field of regulation may be inserted into both the passages for hot water and cold water, or alternatively, a single passage aperture with a narrow section 85 may be inserted into a single pipe for hot water or for cold water with the other passage aperture not being narrowed at all. Embodiments in which the passage apertures of narrow section which determine the first field of regulation are inserted into both the hot water and cold water pipes are described with reference to FIGS. 3 to 12, while other embodiments in which a single passage aperture having a narrow section is inserted into a single pipe for hot water or for cold water are described with reference to FIGS. 13–16.

Figure 3:
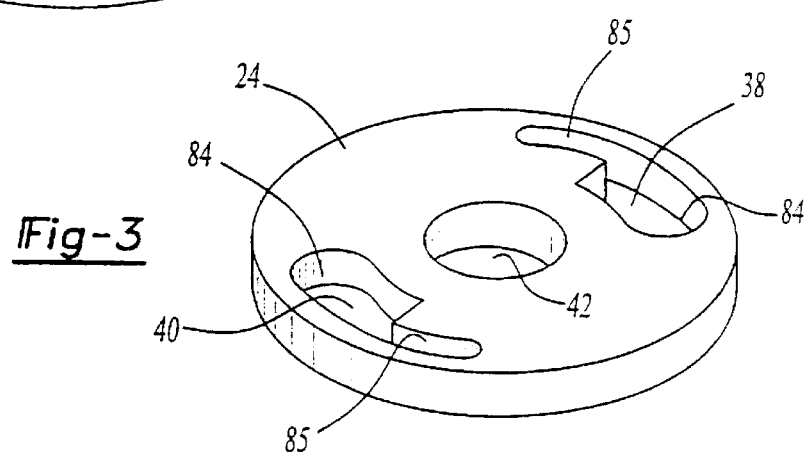
FIG. 3 is a top perspective view of the movable plate shown in FIG. 1.

The valve plate 24, shown in the first embodiment in FIG. 3, has, at the sides of a central aperture 43 for mixed water two hot and cold passage apertures 38 and 40 made with wide sections 84 and narrow sections 85 to determine the different fields of regulation of the valve. In this form of embodiment, narrow section 85 and wide section 84 each pass complete 14 through the valve plate. FIGS. 4a, 4b, 5a, 5b, 6a and 6b (in which for simplicity and clarity of the drawings, the central outlet apertures 34 and 42 have been omitted) illustrate how these valve plates 22 and 24 work together.

Figure 4A:
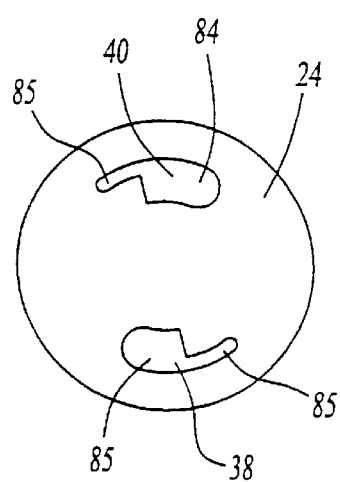
FIGS. 4a and 4b illustrate the movable and fixed valve plates in their relative closed positions.
Figure 4B:
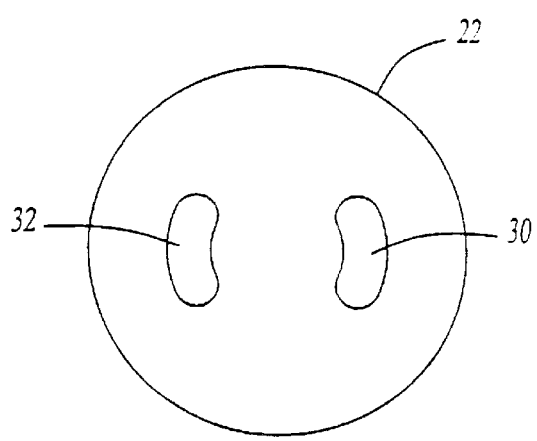

FIGS. 4a and 4b respectively illustrate the moveable plate 24 and the fixed plate 22 in their relative shut off or closed positions. It will be understood that when these valve plates are placed one above the other in this relative position, their inlet passage apertures, respectively 30, 32, 38 and 40 do not align and the flow of the thermostatic mixing valve is completely shut off.

Figure 5A:
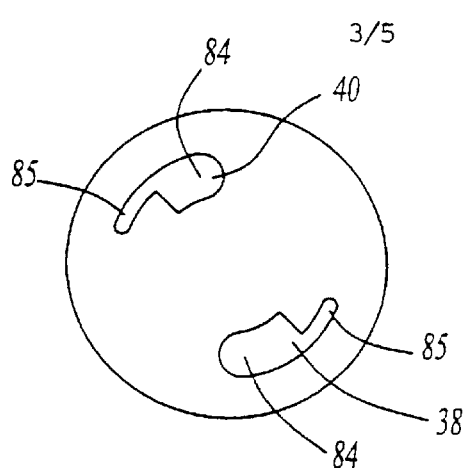
FIGS. 5a and 6a illustrate the movable valve plate in two different operating positions.
Figure 5B:
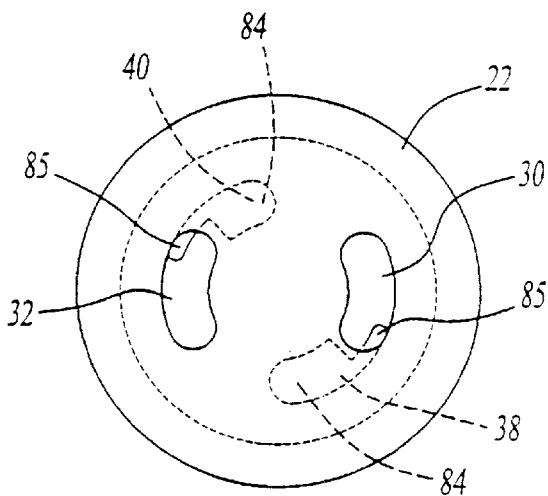
FIGS. 5b and 6b illustrate the relative position of the fixed plate and movable valve plate positioned behind the fixed plate.

If the moveable plate 24 is made to rotate to a position shown in FIG. 5a, and it is placed against the fixed plate 22 as shown in FIG. 5b, only a greater or lesser part of the narrow sections 85 of the moveable plate 24 correspond to the respective inlet passage apertures 30 and 32 of the fixed pate 22. The moveable plate 24 when in this position determines a field of regulation for the thermostatic mixing valve in which the inlets of hot water and cold water are greatly restricted. Consequently, even if the delivered flow rate is reduced due to a high restrictive delivery outlet, a significant drop in pressure occurs when the water passes through the inlet passage apertures of valve plates 22 and 24, and the pressure inside the mixing chamber 80 of the valve is then greatly reduced in relation to the pressures in the supply pipe. This significant drop in pressure at the inlet renders the valve practically insensitive (for purposes of its stability) to differences in pressure, even large ones, which may occur between the supply pipes that may otherwise cause occurrences of instability. It is obvious on the other hand that under these conditions the valve is not capable to supply a plurality of devices which together require a high rate of flow. This field of regulation is suitable for supply to a single outlet of a bank of multiple outlets.

Figure 6A:
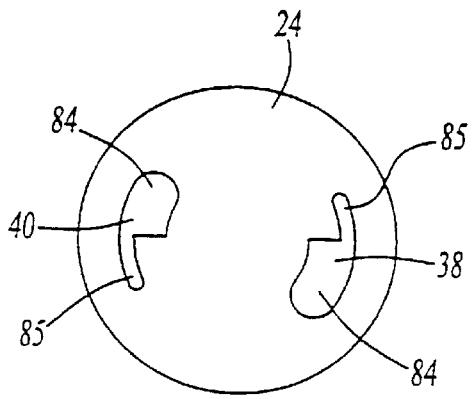
Figure 6B:
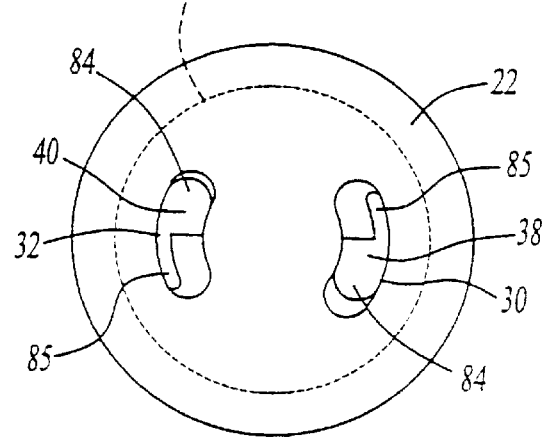

If the moveable plate 24 is then made to rotate to a position like that shown in FIG. 6a, and it is placed above the fixed plate 22 as shown in FIG. 6b, a greater or lesser part of the wide sections apertures 84 of apertures 38 and 40 in the moveable plate 22 aligns with the inlet passage apertures 30 and 32 of the fixed plate 22. The moveable plate 22 when in this position determines a field of regulation for the thermostatic mixing valve in which the inlets for hot water and cold water are only slightly restricted and are operable for high flow rates. Consequently, in this field of regulation, the thermostatic mixing valve is capable of supplying several devices, or devices which require a high flow rate. This field of regulation suitable for the simultaneous supply of a bank of multiple outlets.

The user can therefore set the thermostatic mixing valve to function properly in different conditions simply by rotating the body of the thermostatic mixing valve to a selection position. This rotating action corresponds to the normal action for regulating the flow rate of a faucet and is therefore easy and instinctive. It may be desirable to provide signs or indicators on the visible parts of the thermostatic mixing valve to tell the user if the thermostatic mixing valve is operating for low flow rates or for higher flow rates.

It would seem beneficial in any case to give the user a sensory indication of passage from one field of regulation of the thermostatic mixing valve to another field, for example by means of an index release system. An index mechanism between two relatively mobile parts of the thermostatic mixing valve can be provided. For example, in FIG. 1, in the base 17 there is a ball 88 based by a spring 89, which works together with indentations 90 on the external body 12 of the thermostatic mixing valve 10, so as to produce detent stops which can be resiliently overridden which correspond to the passage from one field of regulation to another. This device makes it easier for the users to tactly determine the correct field of regulation for the thermostatic mixing valve.

Figure 7:
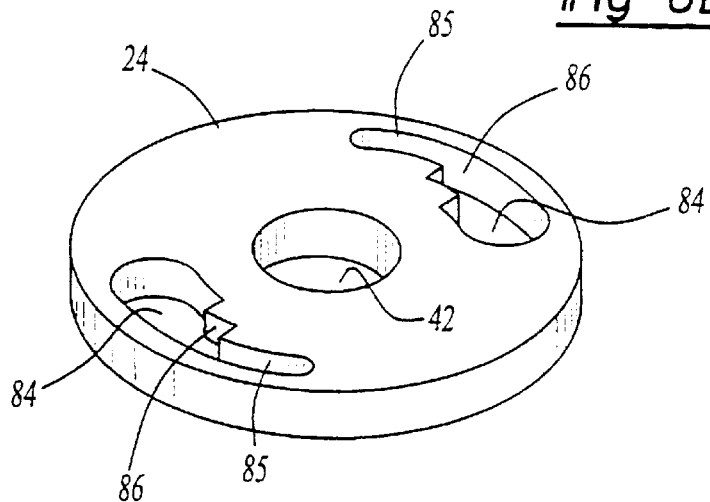
FIG. 7 illustrates a second embodiment of the movable plate.

It may be desirable to provide an intermediate field of regulation with an intermediate flow rate interposed between the field of regulation with low flow rate and a field of regulation with a high flow rate. In such cases it may be necessary to shape the inlet apertures 30 and 32 of the moveable plate 24 as illustrated in FIG. 7. Aperture sections 86 with an intermediate width between the widths of aperture sections 84 and aperture sections 85 are interposed between the aperture sections 84 and 85. In this case there are three fields of regulation of the thermostatic mixing valve instead of two.

Figure 8:
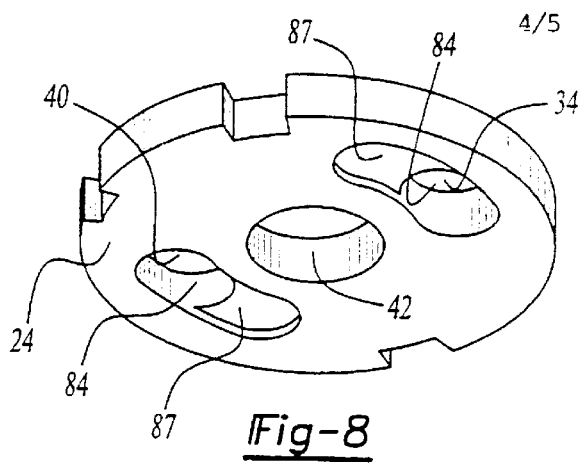
FIG. 8 is a bottom perspective view of a third embodiment of the movable valve plate.
Figure 9:
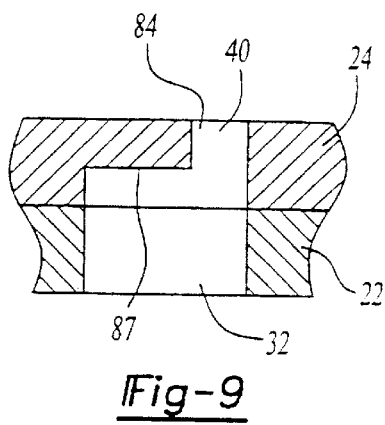
FIG. 9 is a segmented view showing the movable plate in the fully open position with respect to the fixed plate.

Reference now is made to the embodiment illustrated in FIG. 8. The inlet apertures 38 and 40 have wide areas 84 fully passing through plate 24. Stepped sections 87 do not pass completely through the plate 24 and have relatively reduced depth. These stepped sections 87 act in the same fashion, as the narrow section 85 shown in FIG. 3. In fact, the flow which comes from apertures 30 and 32 of the fixed plate 22 runs into these stepped sections 87, and is diverted towards the wide aperture sections 84. However, the flow is greatly restricted due to the limited depth of the stepped sections 87. Operation is therefore identical to that described with reference to the form of embodiment in FIG. 3. However, mass production of the plate shown in FIG. 8, without the narrow sections 85 may prove to be industrially more expeditious and its structure may be more durable.

Figure 10:
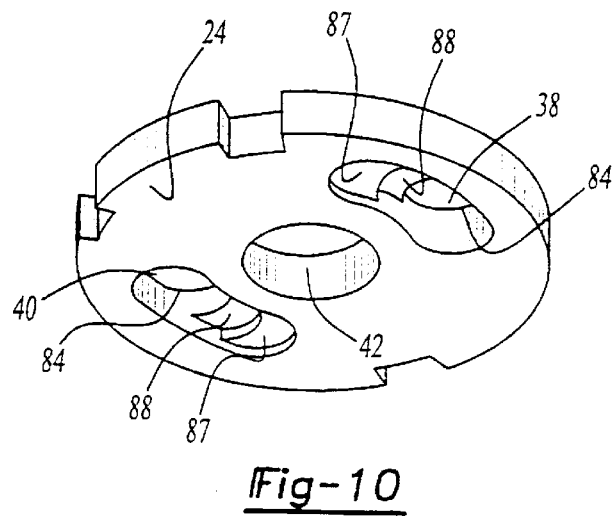
FIG. 10 is a view similar to FIG. 8 illustrating a fourth embodiment.
Figure 11:
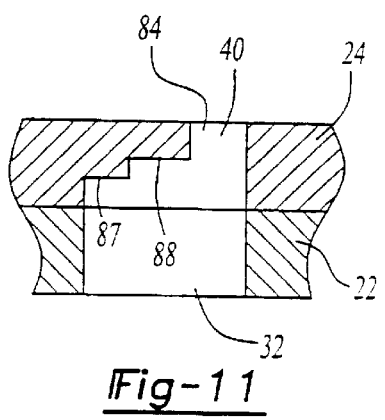
FIG. 11 is a view similar to FIG. 9 for the fourth embodiment.

Reference now is made to the embodiment illustrated in FIGS. 10 and 11 which is constructed to give three fields of regulations. For this purpose lies an intermediate stepped section 88 between the wide crossing apertures 84 and stepped section 87 limited depth. The depth of stepped section 88 is greater than that of stepped section 87. As explained in relation to the preceding example, operation proves identical to that of the form of embodiment shown in FIG. 7, having three aperture sections of different widths.

Figure 12:
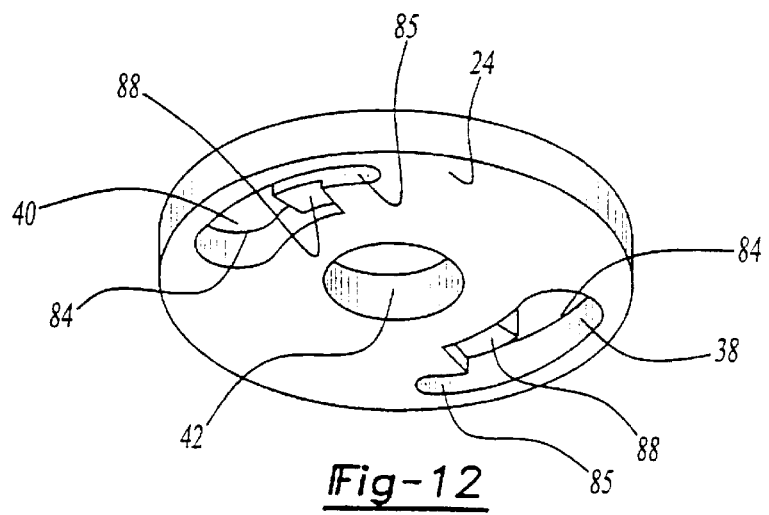
FIG. 12 is a view similar to FIG. 8 illustrating a fifth embodiment.

Reference now is made to the embodiment shown in FIG. 12 where the design criteria for the preceding forms of embodiment are combined. In this case, each inlet apertures 38 and 40 has a wide section 84 that completely passes through plate 24. A narrow slot section 85 also fully passes through plate 24. A stepped section 88 lies adjacent the slot 85 and is of limited depth. It will be understood that this form of embodiment performs in the same way as the forms of embodiment shown in FIGS. 7 and 10.

Reference now is made FIGS. 13–16 where other embodiments are described for the moveable valve plate 24 in which a single passage aperture of having restricted field sections is inserted into a single pipe for hot water or for cold water. The other passage aperture 40 does not have direct restricted field sections.

Figure 13:
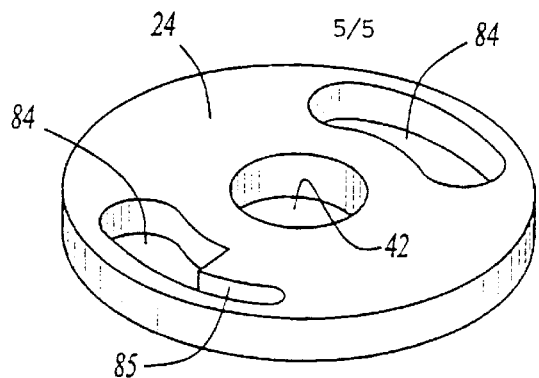
FIG. 13–16 illustrate other embodiments.

The moveable valve plate shown in FIG. 13 is similar to the one already described with reference to FIGS. 10 and 11 and it differs only in the fact that only one of its crossing passage apertures includes a wide section 84 and stepped sections 87 and 88. The other passage aperture on the other hand includes only a conventional arcuate slot section which fully passes through the valve plate. As we have already indicated, in this case, when the valve is in its first field or regulation and only one water inlet, preferably for that of the cold water, is restricted, the reaction of the thermostatic system has the effect of reducing the admission of water from the conventionally shaped inlet which does not have the narrow restricted section. The desired result as previously described is therefore obtained in this case, not directly as a result of the shape of both inlet passage apertures but due to the intervention of the thermostatic system.

Figure 14:
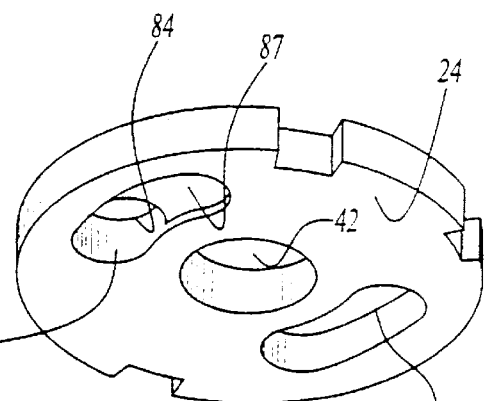

The movable valve plate 24 shown in FIG. 14 is similar to that already described with reference to FIG. 8, and differs from it only in the fact that only one of its passage apertures has a wide section 84 and a stepped section 87 of reduced depth. The other passage aperture on the other hand includes only conventionally shaped wide section 84 which passes through plate 24. The desired result as previously described for FIG. 13 is also obtained in the case due to the intervention of the thermostatic system.

Figure 15:
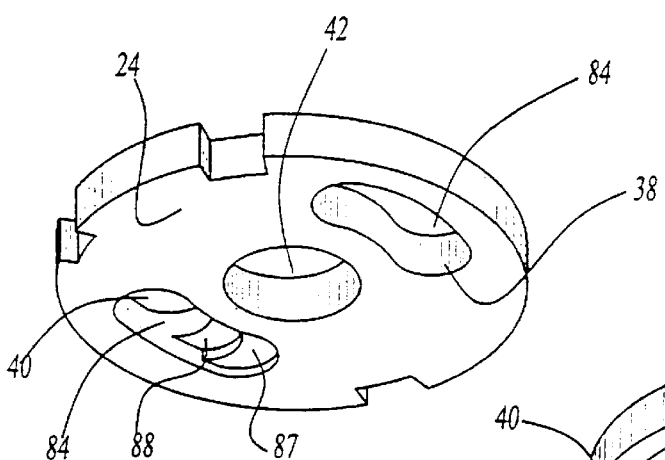

The movable valve plate shown in FIG. 15 is similar to the one already described with reference to FIGS. 10 and 11 and it differs only in the fact that only one of its crossing passage apertures includes a wide section 84 and stepped sections 87 and 88. The other passage aperture on the other hand includes a conventionally shaped wide section which fully passes through the valve plate. As we have already indicated, in this case, when the valve is in its first field of regulation and only one water inlet, preferably for that of the cold water, is restricted, the reaction of the thermostatic system has the effect of reducing the admission of water from the conventionally shaped inlet which does not have the restricted section. The desired results as previously described is therefore obtained in this case, not directly as a result of the shape of both inlet passage apertures but due to the intervention of the thermostatic system.

Figure 16:
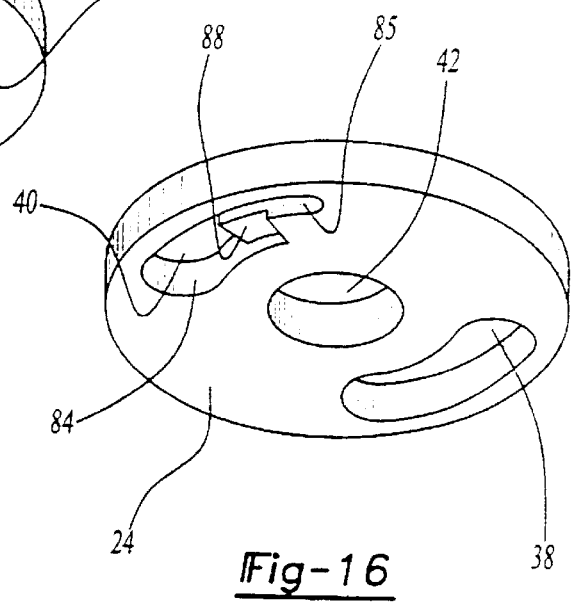

The movable valve plate 24 shown in FIG. 16 is similar to that already described with reference to FIG. 12 and differs from it only in the fact that only one of its passage apertures has a wide section 84, a narrow section 85 and a stepped section 87 of reduced depth. The other passage aperture on the other hand includes only a conventionally shaped wide section 87 which passes through the valve plate. The desired results as previously described for is also FIG. 15 obtained in the case, due to the intervention of the thermostatic system.

It must be understood that the invention is not limited to the forms of embodiment described and illustrated as examples. Several modifications besides those already described are within the capability of a person qualified in the field. For example, the inlet passage apertures of the valve plates may be shaped differently, provided that they form two or more fields of regulation suitable for the delivery of very different flow rates. The special shapes can be formed in the inlet passage apertures of the fixed valve plate, rather than of the moveable valve plate or they may involve both plates. Different methods from those described could be chosen to give the user a visual, tactile or other sensory warning of passage from one to another field of regulation.

In this fashion, a thermostatic valve for a mixing faucet is able to correct the temperature of the outlet water for more varieties of plumbing conditions and water supplies. The invention increases the viability of thermostatic control valves where its mere action without the inventive concept is not sufficient to maintain the outlet water at the preselected or desired temperature.

Other variations and modifications are possible without departing from the scope and spirit of the present invention as defined by the appended claims.

I claim:

1. A thermostatic mixing valve having a cold water inlet port and a hot water inlet port including: a base having two supply ports; a rotatable handle body mounted onto said base and operably connected to a first valving surface with a hot water and cold water inlet passage therethrough that are operably positioned adjacent said two supply ports for controlling volume flow into said housing; a thermostat element operably connected to a movable second valving surface that is movable between first and second seats for controlling the relative flow from the cold and hot water inlet passages in response to the temperature of fluid in a mixing chamber; said ports and said first valving surface being incorporated in two concentrically mounted plates that can be rotated with respect to each other and provided with openings therethrough for the controlled passage of the fluid through the two plates; said thermostatic mixing valve characterized by:

at least one opening in one of said valve plates, is formed with two distinct fields so as to subdivide the entire field of regulation determined by the relative rotation of the plates into at least two successive fields, the first field of regulation, adjacent to the shut off position, being determined by an inlet passage aperture first section of restricted flow and the second field of regulation, after the first, formed by an enlarged cross section; and a discrete third intermediate field of regulation interposes between said first and second sections.

2. A thermostatic mixing valve as defined in claim 1, further characterized by:

the opening is in the form of elongated slot and each offer an initial length of reduced width forming said first section and a final length of enlarged width forming said second section; and a discrete intermediate length of intermediate width between the first reduced width and second enlarged width of the first section widths of the second section.

3. A thermostatic mixing valve as defined in claim 1 further characterized by:

the opening is in the form of an elongated slot of large and uniform width, and having a first section fully extending through the valve plate and a stepped section of limited depth not fully passing through said valve plate; and the opening provided with offer between the said crossing length and the said first derived, a intermediate section of greater depth that that of the stepped section but not passing fully through said plate and interposed between said first section and said stepped section.

4. A thermostatic mixing valve as defined in claim 1 characterized by:

the opening has a wide section fully extending through said plate and a stepped section of limited depth adjacent the narrow first section.

5. A thermostatic mixing valves as defined in claim 1 further characterized by:

visible indicators are mounted on said thermostatic mixing valve which inform the user as to which field of regulation the thermostatic mixing valve is operating in.

6. A thermostatic mixing valve as defined in claim 1 further characterized by:

at least one elastic release device suitable for giving a sensory warning to the user of the passage from one field to another of regulation of the thermostatic mixing valve, said elastic release device being inserted between relatively moving parts of the thermostatic mixing valve.

7. A thermostatic mixing valve as in claim 6 further characterized by:

said elastic release device comprises a spring biased ball that is seated in a first part of the body of the thermostatic mixing valve that can be biased into one or more cavities which face it that are located in a second part of the body of the thermostatic mixing valve.

* * * * *

UNITED STATES PATENT AND TRADEMARK OFFICE
CERTIFICATE OF CORRECTION

PATENT NO. : 6,517,006 B1
DATED : February 11, 2003
INVENTOR(S) : Ing. Alfons Knapp It is certified that error appears in the above-identified patent and that said Letters Patent is hereby corrected as shown below:

Column 10, lines 20-67, Column 11 and Column 12, lines 1-13, Claims 1-7 should appear as follows:

1. A thermostatic mixing valve having a cold water inlet port and a hot water inlet port comprising: a base having two supply ports; a rotatable handle body mounted onto said base and operably connected to a first valving surface with a hot water and cold water inlet passage therethrough that are operably positioned adjacent said two supply ports for controlling volume flow into said housing; a thermostat element operably connected to a movable second valving surface that is movable between first and second seats for controlling the relative flow from the cold and hot water inlet passages in response to the temperature of fluid in a mixing chamber; said ports and said first valving surface being incorporated in two concentrically mounted plates that can be rotated with respect to each other and provided with openings therethrough for the controlled passage of the fluid through the two plates; wherein:
at least one opening in one of said valve plates, is formed with two distinct fields so as to subdivide the entire field of regulation determined by the relative rotation of the plates into at least two successive fields, the first field of regulation, adjacent to the shut off position, being determined by an inlet passage aperture first section of restricted flow and the second field of regulation, after the first, formed by an enlarged cross section; and
a discrete third intermediate field of regulation interposes between said first and second sections.

2. The thermostatic mixing valve as defined in claim 1, wherein:
the opening is in the form of elongated slot and each offer an initial length of reduced width forming said first section and a final length of enlarged width forming said second section; and
a discrete intermediate length of intermediate width between the first reduced width and second enlarged width of the first section widths of the second section.

3. The thermostatic mixing valve as defined in claim 1 wherein:
the opening is in the form of an elongated slot of large and uniform width, and having a first section fully extending through the valve plate and a stepped section of limited depth not fully passing through said valve plate; and
the opening provided with offer between the said crossing length and said first derived, an intermediate section of greater depth than that of the stepped section but not passing fully through said plate and interposed between said first section and said stepped section.

4. The thermostatic mixing valve as defined in claim 1 wherein:
the opening has a wide section fully extending through said plate and a stepped section of limited depth adjacent the narrow first section.

UNITED STATES PATENT AND TRADEMARK OFFICE
CERTIFICATE OF CORRECTION

PATENT NO.      : 6,517,006 B1
DATED           : February 11, 2003
INVENTOR(S)     : Ing. Alfons Knapp It is certified that error appears in the above-identified patent and that said Letters Patent is hereby corrected as shown below:

5. The thermostatic mixing valves as defined in claim 1 wherein:
visible indicators are mounted on said thermostatic mixing valve which inform the user as to which field of regulation the thermostatic mixing valve is operating in.

6. The thermostatic mixing valve as defined in claim 1 wherein:
at least one elastic release device suitable for giving a sensory warning to the use of the passage from one field of another of regulation of the thermostatic mixing valve, said elastic release device being inserted between relatively moving parts of the thermostatic mixing valve.

7. The thermostatic mixing valve as in claim 6 wherein:
said elastic release device comprises a spring biased ball that is seated in a first part of the body of the thermostatic mixing valve that can be biased into one or more cavities which face it that are located in a second part of the body of the thermostatic mixing valve.

Column 12,
Line 14, Claims 8-20 should appear as follows:

8. A thermostatic mixing valve comprising:
a base having two supply ports;
a rotatable handle body mounted onto said base and operably connected to a first valving surface with a hot water inlet passage and a cold water inlet passage that are operably positioned adjacent said two supply ports;
a thermostat element operably connected to a moveable second valving surface that is movable between a first seat and a second seat; and
said first valving surface being incorporated into two concentrically mounted plates that can be rotated with respect to each other, each having openings therethrough for the controlled passage of fluid through the two plates, wherein at least one opening in one of said valve plates is formed with at least a first field of regulation of restricted flow and a second field of regulation.

9. The thermostatic mixing valve as recited in claim 8 wherein said first field of regulation has a reduced width and said second field of regulation has an enlarged width.

10. The thermostatic mixing valve as recited in claim 9 wherein said at least one opening further includes a third field of regulation interposed between said first field of regulation and said second field of regulation.

UNITED STATES PATENT AND TRADEMARK OFFICE
CERTIFICATE OF CORRECTION

PATENT NO.   : 6,517,006 B1
DATED        : February 11, 2003
INVENTOR(S)  : Ing. Alfons Knapp It is certified that error appears in the above-identified patent and that said Letters Patent is hereby corrected as shown below:

11. The thermostatic mixing valve as recited in claim 10 wherein the third field of regulation has an intermediate width between said reduced width and said enlarged width.

12. The thermostatic mixing valve as recited in claim 8 wherein said at least one opening is of a uniform width and said first field of regulation fully extends an entire depth through said valve plate and said second field of regulation partially extends a limited depth through said valve plate.

13. The thermostatic mixing valve as recited in claim 12 wherein said at least one opening further includes a third field of regulation interposed between said first field of regulation and said second field of regulation.

14. The thermostatic mixing valve as recited in claim 13 wherein said third field of regulation has an intermediate depth between said entire depth and said limited depth.

15. The thermostatic mixing valve as recited in claim 8 wherein said first field of regulation has a reduced width and fully extends an entire depth of said valve plate, said second of regulation has an enlarged width and fully extends said entire depth of said valve plate, and a third field of regulation is interposed between said first field of regulation and said second field of regulation and has said enlarged width and extends a limited depth through said valve plate.

16. The thermostatic mixing valve as recited in claim 8 wherein both of said openings of one of said valve plates is formed with at least a first field of regulation of restricted flow and a second field of regulation.

17. The thermostatic mixing valve as recited in claim 8 wherein one of said openings of one of said valve plates is formed with at least a first field of regulation of restricted flow and a second field of regulation.

18. The thermostatic mixing valve as recited in claim 8 further including an indicator to indicate which of said field of regulations said first valving surface is operating in.

19. The thermostatic mixing valve as recited in claim 8 further including at least one elastic release device to indicate passage between said fields of regulation.

UNITED STATES PATENT AND TRADEMARK OFFICE
CERTIFICATE OF CORRECTION

PATENT NO. : 6,517,006 B1
DATED : February 11, 2003
INVENTOR(S) : Ing. Alfons Knapp It is certified that error appears in the above-identified patent and that said Letters Patent is hereby corrected as shown below:

20. The thermostatic mixing valve as recited in claim 19 wherein said elastic release device is a spring biased ball seated in a first part of a body of said thermostatic mixing valve biased to a cavity in a second part of the body of said thermostatic mixing valve to indicate passage between said fields of regulation.

Signed and Sealed this

Twenty-sixth Day of August, 2003

JAMES E. ROGAN
*Director of the United States Patent and Trademark Office*